(No Model.)
J. F. PARSONS.
PHOTOGRAPHIC CAMERA.
No. 500,348. Patented June 27, 1893.
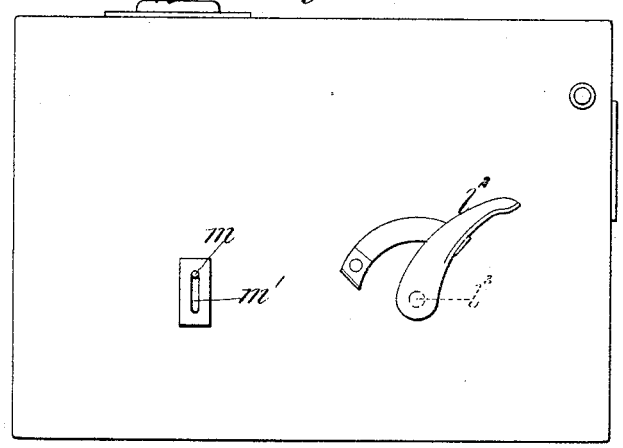
Fig. 1.
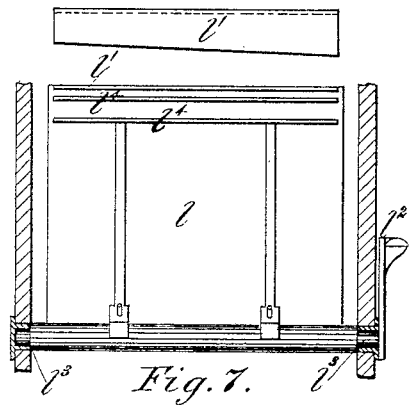
Fig. 8.
Fig. 7.
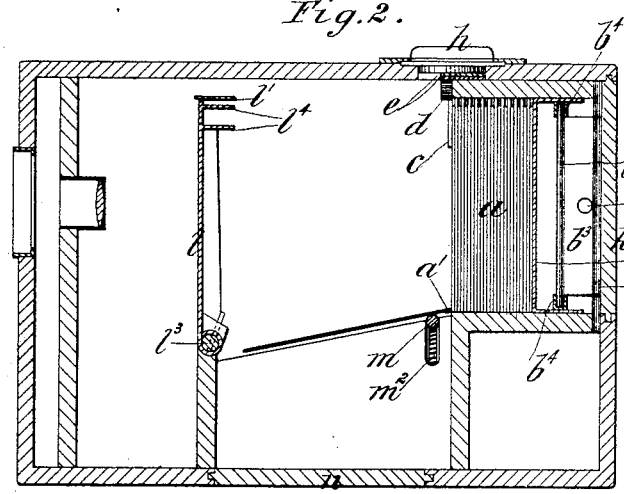
Fig. 2.
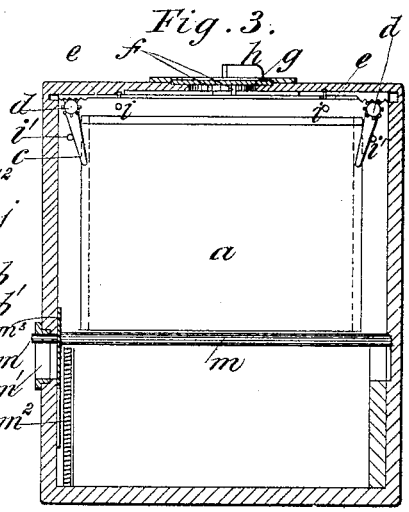
Fig. 3.
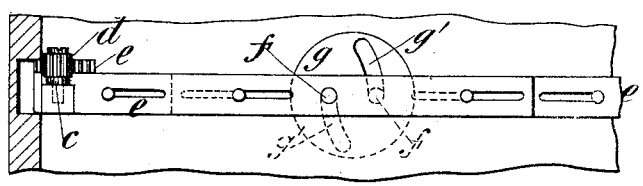
Fig. 5.
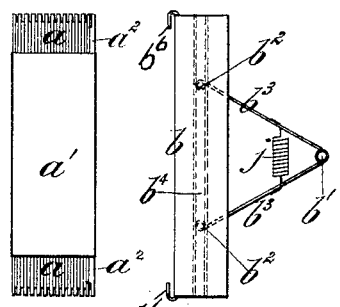
Fig. 6. Fig. 4.
Witnesses:
Percy C. Bowen
John R. Wilson
Inventor,
John Featherstonehaugh Parsons,
By Whitman & Wilkinson
Attorneys.

UNITED STATES PATENT OFFICE.

JOHN FEATHERSTONEHAUGH PARSONS, OF BRISTOL, ENGLAND.

PHOTOGRAPHIC CAMERA.

SPECIFICATION forming part of Letters Patent No. 500,342, dated June 27, 1893.

Application filed January 3, 1893. Serial No. 457,019. (No model.)

*To all whom it may concern:*

Be it known that I, JOHN FEATHERSTONE-HAUGH PARSONS, a subject of the Queen of Great Britain and Ireland, residing at Bristol, England, have invented new and useful Improvements in Photographic Cameras, of which the following is a specification.

This invention relates to photographic cameras—more particularly hand cameras—in which films are used for taking photographs.

According to this invention each film is affixed to a plain card of paper or other suitable substance. The cards or mounts with the films attached are piled together and at the base they are separately hinged to a common foundation of tissue paper, linen or other suitable pliable material. The pack of mounts and adhering films thus arranged in book-form is placed on a shelf in the camera, and a spiral or other suitable spring is brought to bear on the back of the pack which thereby tends to advance toward the lens, but is restrained by stops or checks situated at each side of the camera. When an exposure has been made, the said stops or checks are operated so as to release the foremost film of the pack and to retain the rest. The camera is then tilted forward and the released film descends on its hinge, face downward, until it is arrested by the indicator rod. The operator then turns a rod by which a vane, arm or frame is brought to bear on the back of the mount and forces down the indicator by which latter the descent of the film is indicated to the operator. The film descends to the floor of the camera and is detached at the hinge from the rest of the pack which under the influence of the spring behind it has advanced to the extent of the thickness of a mount. After exposure of the now leading film of the pack, the actions above described are repeated, and so on for each until the whole pack has been exposed.

In the accompanying sheet of drawings Figure 1 represents a side elevation of my improved camera. Fig. 2 is a longitudinal section through the middle of the camera, and Fig. 3 a transverse section taken in front of the indicator rod. Fig. 4 represents a plan of the holder for the packs of films and the spring arrangement by which the packs are impelled toward the lens and pressed against the stops or checks. Fig. 5 illustrates on an enlarged scale the stop or check mechanism as seen from below or from the floor of the camera. Fig. 6 represents a pack of film-carrying cards $a$ turned bottom upward to show the tearable or severable base or binding $a'$ to which the cards are attached by glue, gum or other suitable means. Fig. 7 is a view of the under side of the combined shield and cutter. Fig. 8 is a face view of the cutter.

As aforesaid, the films are affixed to mounts of card or other stiff paper or other suitable substance. The mounts and films are of two sizes, one-half of the number in the pack being longer but not so deep as those constituting the other half of the pack, and the arrangement is such that behind each of the longer mounts is placed one of the shorter but deeper mounts. This arrangement is preserved throughout the pack, as seen more particularly at Figs. 2, 3 and 6. Such packs are hereinafter referred to as packs of films. At the rear of the pack is a card $a^2$, Fig. 6, not having a film attached. This rear card is recessed at the sides so as to receive fingers $b^6$ provided for it in the holder $b$, Figs. 2 and 4, which when a pack of films is to be fitted into it is withdrawn from the camera in a dark room. The holder $b$ with the pack of films placed therein is returned to the camera, the pack being advanced until the foremost film bears against the stops or checks formed by arms $c$ rigidly fixed to the pinions $d$ gearing with racks $e$, free to work on pins passed through slots in the racks which latter engage by means of pins $f$ with grooves $g'$ in the disk $g$, as seen more particularly at Fig. 5. Through the medium of the thumb-piece $h$ carried on the outside of the camera top, the pinions $d$ and racks $e$ are operated at will so as to turn the arms $c$ from the position shown at Figs. 2, 3 and 5 so as to pass up clear of the face of the foremost film and on to the face of the film behind. Again by a reverse movement of the thumb-piece $h$ the stops or checks $c$ are lowered to the position seen at Figs. 2, 3 and 5. The range of upward movement is controlled by the stops $i$ and of the downward movement by stops $i'$, Fig. 3.

When, as aforesaid, a pack of films has been placed in the camera the rod $b'$ of the holder $b$ is inserted in recesses formed for it in the frame of the camera and by this act the pins $b^2$ of the arms $b^3$ hinged to the rod $b'$ are forced apart in the grooves $b^4$ from the position shown at Fig. 4 to that shown at Fig. 2—that is to say the spring $j$ is extended. The slide $k$ is then closed and by the constant strain exerted thereafter by the spring $j$ to contract and draw the pins $b^2$ toward one another the pack of films is maintained firmly pressed against the checks or stops $c$. It is, of course, understood that the camera is furnished with a proper shutter for the lens though none is shown in the drawings.

After an exposure has been made the shield $l$ carrying the cutter $l'$ is raised, to the position shown at Fig. 2, by pushing back the lever $l^2$, Fig. 1, which is secured upon the spindle $l^3$ to which the shield is rigidly fixed. The foremost film is then freed from the restraint of the checks $c$ and on the camera being tilted forward the film turns on its flexible hinge $a'$ and lies on the indicator rod $m$, as seen at Fig. 2. The shield $l$ is now turned down, and the cutter $l'$ severs the film from its base, the ribs $l^4$ holding the film firmly on the rod $m$ which as the shield $l$ is further depressed is forced down to the bottom of the groove $m'$, the upward tendency of the spring which normally holds up the rod $m$ being overcome. Behind the groove $m'$ and inside the camera is a plate $m^3$ to exclude light at all times. This plate is fixed upon and moves with the rod $m$. As one end of the rod $m$ is visible from the exterior of the camera its position at the bottom of the groove is a certain indication that the exposed film has been turned down and has been severed from its base and is lying shielded from light. In this position of the shield the cutter $l'$ the back end of which is made to project slightly above the shield acts as a check to the lower end of the pack of films and thus assists to keep the pack back in its proper place. On the shield $l$ being raised, the shutter being closed, the severed film freed from the grasp of the ribs $l^4$ falls to the bottom of the camera and the rod $m$ is raised by the spring $m^2$ to the top of the groove $m'$, and similarly, with each film until the entire pack has been used, the card $a^2$ being alone left in the holder $b$.

When, at any time, it is desired to remove a film or films from the dark box of the camera the slide $n$ at the bottom is withdrawn for that purpose.

What I claim is—

1. In a photographic camera, adapted to receive a package of photographic films of different length and width arranged alternately, the combination with arms pivoted therein at the upper corners of the camera, of racks gearing with the said arms and rocking the same, and means for moving the racks so as to cause the arms to pass from in front of the front film of the package and to a position in front of the projecting portion of the one in the rear thereof, substantially as described.

2. In a photographic camera adapted to receive a package of photographic films, the combination with rocking arms adapted to hold and release the said films, of a rod in front of and below the lower ends of the said films, and a shield pivoted in front of the said rod and having a cutter thereon adapted to sever a film when the said shield is lowered, substantially as described.

3. In a photographic camera adapted to receive a package of photographic films, the combination with arms adapted to hold or release the said films, of a spring supported rod in front of and below the lower ends of the said films, and a shield pivoted in front of the said rod having a cutter thereon adapted to sever a film and to be holding the film upon the said rod when the said shield is lowered, substantially as described.

4. In a photographic camera adapted to receive a package of photographic films, the combination with arms adapted to hold and release the said films, of a spring supported rod in front of and below the lower ends of the said films, a shield pivoted in front of the said rod having a cutter thereon, at its free end adapted to sever a film, and ribs adjacent to the cutter to hold the film upon the said rod, and means upon the outside of the camera to actuate the said shield, substantially as described.

5. In a photographic camera adapted to receive photographic films of different length and width arranged alternately, the combination with a slotted disk or racks having pins thereon engaging in the said slot, and pivoted arms at the upper corner of the camera engaging the said racks and adapted when moved from in front of the first film of the package to a position in front of the projecting portion of the one in the rear thereof, substantially as described.

In testimony whereof I have signed my name to this specification in the presence of two subscribing witnesses.

JOHN FEATHERSTONEHAUGH PARSONS.

Witnesses:
 HERBERT EWINGS COLLINS,
 *Bushy Park, Bristol.*
 CHARLES POPHAM FRENCH,
 *Bank Buildings, Bristol.*